US006303688B1

(12) United States Patent
Schauder

(10) Patent No.: US 6,303,688 B1
(45) Date of Patent: *Oct. 16, 2001

(54) RUBBER TOUGHENED BLENDS

(75) Inventor: Jean-Roch Hector Schauder, Wavre (BE)

(73) Assignee: Exxon Mobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,550

(22) PCT Filed: Sep. 10, 1996

(86) PCT No.: PCT/EP96/03993

§ 371 Date: Jul. 17, 1998

§ 102(e) Date: Jul. 17, 1998

(87) PCT Pub. No.: WO97/11120

PCT Pub. Date: Mar. 27, 1997

(30) Foreign Application Priority Data

Sep. 22, 1995 (GB) .................................................. 9519381

(51) Int. Cl.⁷ ............................ C08L 77/00; C08L 67/00; C08L 69/00; C08L 75/10
(52) U.S. Cl. .............................. 525/63; 525/64; 525/66; 525/67
(58) Field of Search ............................. 525/179, 63, 64, 525/66, 67

(56) References Cited

U.S. PATENT DOCUMENTS

| 3,326,917 | 6/1967 | Freimiller et al. | 260/279 |
| 4,722,971 | 2/1988 | Datta et al. | 525/211 |
| 4,950,541 | 8/1990 | Tabor et al. | 428/373 |
| 5,017,714 | 5/1991 | Welborn, Jr. | 556/12 |
| 5,055,438 | 10/1991 | Canich | 502/117 |
| 5,096,867 | 3/1992 | Canich | 502/103 |
| 5,153,157 | 10/1992 | Hlatky et al. | 502/117 |
| 5,194,509 | 3/1993 | Hasenbein et al. | 525/285 |
| 5,198,401 | 3/1993 | Turner et al. | 502/155 |
| 5,240,894 | 8/1993 | Burkhardt et al. | 502/108 |
| 5,264,405 | 11/1993 | Canich | 502/103 |
| 5,324,800 | 6/1994 | Welborn, Jr. et al. | 526/160 |
| 5,346,963 | 9/1994 | Hughes et al. | 525/285 |
| 5,507,475 | 4/1996 | Seel et al. | 267/64.12 |
| 5,663,229 * | 9/1997 | Presenz et al. | 524/399 |
| 5,670,575 * | 9/1997 | Flexman, Jr. | 525/66 |

FOREIGN PATENT DOCUMENTS

| 1268753 | 5/1990 | (CA) . |
| 0 129 368 | 12/1984 | (EP) . |
| 0072480 A2 | 1/1986 | (EP) . |
| 0 277 003 | 8/1988 | (EP) . |
| 0 277 004 | 8/1988 | (EP) . |
| 0207388 A2 | 3/1990 | (EP) . |
| 0375389 A1 | 6/1990 | (EP) . |
| 0 506 095 | 9/1992 | (EP) . |
| 0 520 732 | 12/1992 | (EP) . |
| 0346837 A2 | 7/1994 | (EP) . |
| 0 227 206 | 1/1995 | (EP) . |
| 0319339 A2 | 8/1995 | (EP) . |
| WO 92/00333 | 1/1992 | (WO) . |
| WO 93/03093 | 2/1993 | (WO) . |
| WO 94/03506 | 2/1994 | (WO) . |

OTHER PUBLICATIONS

Morton, *Rubber Technology*, Van Nostrand Reinhold, London, England (1987)—Book.

Liquid Chromatography of Polymers and Related Materials III, J. Cazes, ed., Marcel Dekker, New York (1981), pp. 207–235–On Line Determination by Light Scattering of Mechanical Degradation in the GPC Process by J.G. Rooney and G. Ver Strate.

Verstrate, Gary—"Ethylene–Propylene Elastomers"—Encyclopedia of Polymer Science and Engineering, vol. 6, John Wiley & Sons, New York (1986)—pp. 522–564.

ASTM D1238—"Standard Test Method for Flow Rates of Thermoplastics by Extrusion Plastometer"—American Society for Testing and Materials.

ASTM D3835—"Standard Test Method for Determination of Properties of Polymeric Materials by Means of a Capillary Rheometer"—American Society for Testing and Materials.

ASTM D792—"Standard Test Methods for Density and Specific Gravity (Relative Density) of Plastics by Displacement"—American Society for Testing and Materials.

*Research Disclosure*, No. 337, May 1, 1992—p. 421, "Impact Modification of Nylon 6,6 and of Nylon 6 with a Combination of Impact Modifiers".

* cited by examiner

Primary Examiner—Ana Woodward

(57) ABSTRACT

This invention relates to a rubber toughened composition comprising
a) 5 to 50 weight percent of a composition comprising:
an ethylene polymer having a composition distribution breadth index of 50% or more and containing 0.1 to about 10 weight percent of an unsaturated acid or anhydride, and an elastomer; and
b) 95 to 50 weight percent of a thermoplastic polymer containing a functional group capable of interacting with the unsaturated acid or anhydride.

15 Claims, No Drawings

RUBBER TOUGHENED BLENDS

FIELD OF THE INVENTION

This invention relates to a rubber toughened thermoplastic composition comprising a functionalized ethylene polymer, an elastomer and a thermoplastic polymer.

BACKGROUND OF THE INVENTION

U.S. Pat. No. 5,346,963 describes substantially linear olefin polymers produced by Dow Chemical Company's "constrained geometry" catalysts grafted with an unsaturated organic compound which exhibit adhesive properties as well as imparting desirable impact properties to various thermoplastic polymer blends. The disclosure does not describe however the combination of a grafted ethylene polymer and an elastomer used to modify a thermoplastic polymer to achieve improved low temperature impact properties.

SUMMARY OF THE INVENTION

This invention relates to a rubber toughened thermoplastic composition comprising an ethylene copolymer grafted with an unsaturated acid or anhydride, an elastomer and a thermoplastic polymer comprising a functional group capable of interacting with the unsaturated acid or anhydride.

DETAILED DESCRIPTION

This invention relates to a rubber toughened thermoplastic composition comprising:

a) 5 to 50 weight % of an ethylene polymer having a Composition Distribution Breadth Index of 50% or more grafted with an unsaturated acid or anhydride and an elastomer; and b) 95 to 50 weight percent of a thermoplastic polymer comprising a functional group capable of interacting with the unsaturated acid or anhydride.

In a preferred embodiment the ethylene polymer and the elastomer, which together make up component a) above, are present at 5 to 30 weight percent, even more preferably 10 to 25 weight percent and the thermoplastic polymer is present at 95 to 70 weight percent, more preferably 90 to 75 weight percent, based upon the weight of the ethylene polymer, the elastomer and the thermoplastic polymer.

In a preferred embodiment component a) comprises about 10 to about 70 weight % ethylene polymer, more preferably 15 to 50 weight percent ethylene polymer and about 90 to 30 weight percent elastomer, even more preferably 85 to 50 weight percent, based upon the weight of the ethylene polymer and the elastomer.

In a preferred embodiment the ethylene polymer is homopolymer of ethylene or copolymer of ethylene and an α-olefin, preferably a $C_3$ to $C_{40}$ α-olefin, even more preferably a $C_3$ to $C_{18}$ α-olefin, even more preferably a $C_3$ to a $C_{12}$ α-olefin. In a preferred embodiment the ethylene polymer has a molecular weight distribution (Mw/Mn) of 4 or less, preferably 3 or less, even more preferably 2 or less, even more preferably between 2 and 1. In another preferred embodiment the ethylene copolymer has a Composition Distribution Breadth Index (CDBI) of 50% or more, preferably 60% or more, even more preferably 70% or more, even more preferably 80% or more, even more preferably 90% or more. CDBI is a measure of the uniformity of comonomer distribution within a given sample and is measured according to the method described in PCT publication WO 93-03093, published Feb. 18, 1993. A homopolymer has a CDBI of 100%. The ethylene polymer may have an Melt Index of 150 g/10 min or less, preferably 20 g/10 min or less, even more preferably 10 g/10 min or less, even more preferably 5g/10 min or less.

The ethylene polymer further comprises an unsaturated acid or anhydride. Preferred unsaturated acid or anhydride include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, α-methyl crotonic, and cinnamic acids as well as their anhydrides, ester and salt derivatives. Maleic anhydride is particularly preferred. The unsaturated acid or anhydride is preferably present at about 0.1 weight % to about 10 weight %, preferably at about 0.5 weight % to about 5 weight %, even more preferably at about 1 to about 3 weight %, based upon the weight of the ethylene polymer and the unsaturated acid or anhydride.

Ethylene polymers having narrow Mw/Mn and high CDBI's can be produced by the methods described in U.S. Pat. No. 5,055,438; U.S. Pat. No. 5,507,475; U.S. Pat. No. 5,096,867; U.S. Pat. No. 5,264,405; U.S. Pat. No. 5,324,800; U.S. Pat. No. 5,017,714; U.S. Pat. No. 5,240,894; U.S. Pat. No. 5,198,401; U.S. Pat. No. 5,153,157; WO 92 00333; WO 94 03506; EPA 520,732; EPA 129,368; EPA 277,003; EPA 277,004; and CA 1,268,753, which are incorporated by reference herein. Such polymers are available from Exxon Chemical Company in Baytown, Tex. under the Tradenames EXCEED™ and EXACT☒. These polymers can be modified to contain the unsaturated acid or anhydride group by methods known in the art, such as U.S. Pat. Nos. 3,326,917, 4,950,541 and 5,194,509, which are incorporated by reference herein.

In a preferred embodiment the elastomer is any elastomer typically known in the art, including but not limited to, ethylene based elastomers, such as styrene-butadiene rubber, ethylene propylene rubber, ethylene propylene diene monomer rubber; styrene based elastomers such as styrene-butadiene-styrene block copolymers, styrene-isoprene-styrene block copolymers; isobutylene based polymers such as polyisobutylene, isobutylene-isoprene rubber, isosbutylene-para-methylstyrene rubber, natural rubber. Other commercially available rubbers are also acceptable elastomers, such as polychloroprene, nitrile rubber, polybutadiene, polyisoprene, poly(butadiene-co-styrene). For more information on the properties of the various elastomers and their manufacture, see Morton, *Rubber Technology*, Van Nostrand Reinhold, London, England 1987. In another embodiment the elastomer is also functionalized with an unsaturated acid or anhydride group. For example maleated EPDM can be used as the elastomer. Typical molecular weights are greater than 50,000, even more preferably greater than 100,000.

In a particularly preferred embodiment, the elastomer is an ethylene-higher α-olefin, polymer composition comprising:

i) a first polymer fraction having a number average molecular weight of from 10,000 to 500,000, an ethylene content of from 30 to 80 weight %, preferably 40 to 80 weight %, even more preferably 50–70 weight %, and a diene content of from 1 to 12 weight %, preferably 1.5 to 10 weight %, even more preferably 2 to 6 weight %, based upon the weight of the polymer; and ii) a second polymer fraction having a number average molecular weight of from 100,000 to 10,000,000, preferably 200,000 to 1,000,000, an ethylene content of from 40 to 90 weight %, preferably 40 to 80 weight %, even more preferably 50–70 weight %, and a diene content of from 0 to 12 weight %, preferably 0 to 8 weight %, even more preferably 0 to 6 weight %, based upon the weight of the polymer; provided that:

a) the second fraction has a higher molecular weight than the first fraction, b) the second fraction has an equal or higher ethylene content than the first fraction, c) the weight ratio of diene in the first fraction to diene in the second fraction can vary from 0.5 to 1, from 2.0 to1 or even more (when the second fraction has no diene the ratio is of course infinity), in preferred embodiments the ratio is at least 0.5 to 1, preferably at least 0.8 to 1, d) the Mw/Mn of each fraction is independently from 2 to 6.5, preferably 2 to 5, even more preferably 2 to 4 and e) the first fraction comprises 60 to 95 weight %, preferably 70–95 weight % of the total polymer composition.

In general, however these ethylene-higher α-olefin polymers are copolymers of ethylene and a $C_3$ to $C_8$ α-olefin, preferably propylene and an optional diene, preferably a non-conjugated diene. Preferred dienes include straight chain alicyclic dienes (such as 1,4 hexadiene), branched chain dienes, acyclic dienes (such as 5-methyl-1,6-hexadiene), single ring alicyclic dienes (such as 1,4-cyclohexadiene), multi ring alicyclic fused and bridged ring dienes (such as dicyclopentadiene), bridged ring dienes (such as alkenyl, alkylidene, cycloalkenyl and cycloalkylidene norbornenes) and the like. Particularly preferred dienes include 5-ethylidene-2-norbornene, methylene norbornene and vinyl norbornene.

In a preferred embodiment these ethylene-higher α-olefin composition polymers have a branching index between 0.1 and 0.8, more preferably between 0.2 and 0.7.

These ethylene higher alpha-olefin polymers are further described and produced according to EP 227 206 B2 (which is equivalent to U.S. Pat. No. 4,722,971), which is incorporated by reference herein. Vistalon™ 7500 is a preferred elastomer for use herein that is produced according to the process in EP 227 206 and is available from Exxon Chemical Company, a Division of Exxon Corporation in Baytown, Tex.

In another preferred embodiment the ethylene higher-alpha olefin polymer is grafted with at least 0.05 weight %, preferably 0.05 to 5 weight %, even more preferably 0.2 to 3 weight %, based upon the weight of the polymer, of an unsaturated organic compound containing at least one carbonyl group. The grafting may be accomplished by any technique known in the art such as those disclosed in U.S. Pat. Nos. 3,236,917; 4,950,541 and 5,194,509 which are incorporated by reference. Unsaturated organic compounds containing at least one carbonyl group are those compounds containing at least one unsaturation and at least one carbonyl group (—C=O). Representative compounds include the carboxylic acids, anhydrides, esters and their salts, both metallic and non-metallic. Preferred compounds contain ethylenic unsaturation conjugated with a carbonyl group. Preferred examples include maleic acid, fumaric, acrylic, methacrylic, itaconic, crotonic, α-methyl crotonic and cinnamic acids, their anhydride, ester and salt derivatives, as well as glycidylmethacrylate, glycidyl acrylate or other glycidyl compounds. Maleic anhydride is a preferred unsaturated organic compound.

In a particularly prefered embodiment the grafted ethylene higher-alpha olefin polymer typically has the desirable combination of 1. a melt flow rate (MFR, as measured by ASTM D 1238 10 kg, 230° C.) of 3 g/10 min or less, preferably 0.2 to 3, even more preferably 0.2 to 1, and 2. a low shear rate viscosity, (as measured by capillary rheometer at 235° C. and at a shear rate of 10 $\sec^{-1}$ according to ASTM 3835-95 ) above 4000 Pa·sec, preferably above 5000 Pa·sec, and 3. a high shear rate viscosity, (as measured by capillary rheometer at a shear rate of 1000 $\sec^{-1}$ according to ASTM 3835-95 )of 1000 Pa·sec or less, preferably below 500 Pa·sec, and 4. a level of unsaturated organic compounds of 0.5 to 20 weight %, based upon the weight of the copolymer. The unsaturated organic compounds content is measured by FTIR (Fourrier Transformed Infrared spectroscopy). The reaction products are compressed at t°≈165° C. into thin films from which infrared spectra were taken using a Mattson Polaris™ Fourrier Transformed Infrared spectrometer at 2 $cm^{-1}$ resolution with the co-addition of 10 scans. The relative peak height of the anhydride absorption band at 1790 $cm^{-1}$ and of the acid absorption (coming from the anhydride hydrolysis in the air) at 1712 $cm^{-1}$ compared with a band at 4328 $cm^{-1}$ serving as internal standards are taken for the measurement of the MA content.

$$\% \ MA = k \ \frac{A1790 + A1712}{A4328}$$

k being determined after internal calibration with standards.

5. a gel level of 5% or less preferably 3% or less even more preferably of 1% or less, most preferably of 0% (as measured by extraction with refluxing xylene in a soxlet for 8 hours).

Number average molecular weight of the second fraction can be calculated according to the equation $Mn_T = Mn_{F1}{}^{a}*Mn_{F2}{}^{(1-a)}$ where $Mn_T$ is the number average molecular weight of the final polymer, $Mn_{F1}$ the number average molecular weight of the first fraction, $Mn_{F2}$ is the number average molecular weight of the second fraction and a is the weight percent of the first fraction.

The branching index (BI) of a ethylene-higher α-olefin diene is determined using a branching index factor. Calculating this factor requires a series of three laboratory measurements of polymer properties in solution. (See Verstrate, Gary, "Ethylene-Propylene Elastomers, "Encyclopedia of Polymer Science and Engineering", 6, second edition, 1986., incorporated by reference herein.) These are:

i) weight average molecular weight(Mw, LALLS) measured using low angle laser light scattering (LALLS) technique subsequent to a gel permeation chromatograph (GPC);

ii) weight average molecular weight (Mw, DRI) and viscosity average molecular weight, (Mv, DRI) using a differential refractive index detector (DRI) with GPC and iii) inherent viscosity (IV) measured in Decalin at 135° C.

The first two measurements are obtained in a gel permeation chromatograph (GPC) using a filtered dilute solution of the polymer in tri-chloro benzene. An average branching index (BI) is defined as:

$$BI=((Mv,br) \times (Mw,DRI)) \div ((Mw,LALLS) \times (Mv,DRI))$$

where $Mv,br=k(IV)^{1/a}$; Mv,br is viscosity average molecular weight for branched polymer and "a" is the Mark-Houwink constant (=0.759 for an ethylene, α-olefin, non-conjugated diene elastomeric polymer in decalin at 135° C.) "k" is a constant with a value of $2.47 \times 10^{-4}$.

From the equation if follows that the branching index for a linear polymer is 1.0 and for branched polymers the extent of branching is defined relative to the linear polymer. Since at a constant Mn, $(Mw)_{branch}$ is greater than $(MW)_{linear}$, BI for a branched polymer is less than 1.0, an a smaller BI value denotes a higher level of branching. It should be noted that this method is only indicative of the relative degree of branching and not a quantified amount of branching as would be determined using a direct method such as NMR.

Preferred thermolastic polymers include any thermoplastic copolymer comprising a functional group capable of interacting with the unsaturated acid or anhydride group present with the ethylene polymer. Examples include, polyamides, including nylon 6 and nylon 66, polyesters including polyethylene terephthalate, polybutylene terephthalate, polyacetal, polycarbonate, and the like. Polyamides and polyesters are a preferred thermoplastic polymers.

The ethylene polymer and the elastomer may be preblended by standard techniques known in the art such as dry blending, tumble blending and or melt blending. Mixing with the thermoplastic polymer can be done by the standard mixing methods known in the art such as melt blending, extrusion on a single or double screw extruder, and or mixing in a Banbury. Mixing conditions can include high temperatures, high shear, low shear, and the like. Typically the mixture must be heated at some point to melt the thermoplastic polymer. Hence in a preferred embodiment the blend is heated to a temperature near or above the thermoplastic polymers melting point. In a preferred embodiment the ethylene polymer and the elastomer are mixed together prior to blending with the thermoplastic polymer in a masterbatching type process.

The blended product can be used in a variety of applications and can be used in any application where rubber toughened polymers are used today, including but not limited to, molded articles, including but not limited to parts such as car trim, car interior parts, car bumpers and the like.

EXAMPLES

REXT polymers were produced by adding 0.025%–0.25 wt % of a 10% solution of peroxide (Lupersol 1030) in oil with 1 to 4 wt % maleic anhydride to the EXACT polymer in an extruder.

ZYTEL 101 is polyamide 66.

ULTRAMID B3 is polyamide 6.

REXT 704 is EXACT 4049 grafted with 0.9 weight % of maleic anhydride and has a Melt Flow Rate of 2.1 g/10 min at 150° C., 10 kg as measured by ASTM D1238, 150° C., 10 kg. (EXACT 4049 is a copolymer of ethylene and butene having a CDBI over 50%, a narrow molecular weight distribution (Mw/Mn), an Melt Index "MI" of 4.5 g/10 min and a density 0.873 g/cm³.

REXT 669 is EXACT 3002 grafted with 0.9 weight % of maleic anhydride and has a Melt Flow Rate of 1.4 g/10 min at 150° C., 10 kg as measured by ASTM D1238, 150° C., 10 kg. (EXACT 3002 is a copolymer of ethylene and 10 weight % of butene having a CDBI over 50%, a narrow molecular weight distribution (Mw/Mn) and an MI of 4 g/10 min.

REXT 670 is EXACT 3002 grafted with 2.9 weight % of maleic anhydride and has a Melt Flow Rate of 0.7 g/10 min at 150° C., 10 kg as measured by ASTM D1238, 150° C., 10 kg.

VISTALON 606 is an ethylene-propylene rubber having 54 wt % ethylene and a Mooney Viscosity ML(1+4), 125° C. of about 65.

REXT 750 is EXACT 4049 grafted with 3 weight % of maleic anhydride and has a Melt Flow Rate of 0.9 g/10 min at 150° C., 10 kg.

REXT 751 is EXACT 4033 grafted with 0.35 weight % of maleic anhydride and has a Melt Flow Rate of 4 g/10 min at 150° C., 10 kg, measured according to ASTM 1238.

EXACT 4033 is a copolymer of ethylene and butene having a CDBI over 50%, a narrow MWD and a Melt Index "MI" of 0.8 g/10 min and a density of 0.88 g/cm³. (Density is measured by ASTM D-792).

EP1 is a ethylene-propylene-ethylidene norbornene terpolymer having an MFR of 0.3 g/10 min, an ethylidene norbornene content of 5.7 wt %, an Mw/Mn of 3.2 and a BI of 0.6, a low shear rate (10 sec$^{-1}$) viscosity of 20,000 Pa·s at 235° C. and a high shear rate (1000 sec$^{-1}$) viscosity of 700 Pa·s at 235° C. EP1 also has 55 wt % ethylene, 5,7 weight % diene in the first fraction, 55 wt % ethylene and 5.7 wt % diene in the second fraction, an Mn in the first fraction of 67,000 and an Mn in the second fraction of 300,000, an Mw/Mn of 5 in the first fraction and an Mw/Mn of 4.7 in the second fraction.

REXT 767 is EP1 grafted with 1 weight % of maleic anhydride and has a Melt Flow Rate of 1 g/10 min at 230° C., 10 kg.

Viscosity is measured by capillary rheometer according to ASTM 3835-95.

Mw and Mn are measured by gel permeation chromatography using polyisobutylene standards on a Waters 150 gel permeation chromatograph dectector and a Chromatix KMX-6 on line light scattering photometer. The system is used at 135° C. with 1,2,4-trichlorobenzene as the mobile phase. Showdex (from Showa Denks America, Inc.) polystyrene gel columns 802, 803, 804 and 805 were used. This technique is discussed on "Liquid Chromotography of Polymers and Related Materials III" J. Cazes editor, Marcel Dekker, 1981, p207 which is incorporated by reference herein. No corrections for column spreading were employed. Mw/Mn was calculated from elution times. The numerical analyses were performed using the commercially available Beckman/CIS LALLS software in conjunction with the standard Gel Permeation package.

In the following examples the elastomer and the grafted ethylene polymer were dry blended in and thereafter fed into a laboratory scale twin screw extruder having corotating screws one inch in diameter and an l/d ratio of 40. The barrel was heated to 230° C. (for blends involving PA-6) or 260° C. (for blends involving PA-6,6). The extrudate was pelletized and then injection molded and tested for the following properties:

Flex modulus, (MPa) DIN 53457,
Stress at Maximum load, (MPa) DIN 53457,
Elongation at Break, (%) DIN 53457,
E-Modulus (MPa) DIN 53457,
Notched-Izod Impact, (KJ/m²)ISO 180,
Notched Charpy Impact, (KJ/m²) ISO 179,
Melt Flow Ratio "MFR@235° C." (g/10 min) ASTM D 1238 (235° C., 2.16 Kg).
Melt Flow Ratio "MFR@275° C." (g/10 min) ASTM D 1238 (275° C., 10 Kg).
Melt Index g/10 min ASTM 1238 D, condition E.

The blend proportions and the data are reported in Tables 1, 2 and 3.

TABLE 1

| | Blend | | | | |
|---|---|---|---|---|---|
| | 1 | 2 | 3 | 4 | 5 |
| Ultramid B3 | 80 wt % | 80 wt % | 80 wt % | 80 wt % | 80 wt % |
| REXT 704 | 20 wt % | | | | |
| REXT 670 | | 7 wt % | 3 wt % | | |
| REXT 750 | | | | 2.6 wt % | |
| REXT 751 | | | | | 20 wt % |
| Vistalon 606 | | 13 wt % | 17 wt % | 17.4 wt % | |
| Flex. Mod. (MPa) | 1458 | 1486 | 1471 | 1450 | 1478 |
| Stress at Max. Load (MPa) | 47 | 47 | 47 | 42 | 45 |
| Elongation at Break (%) | 55 | 41 | 54 | 42 | 70 |
| E-Modulus (MPa) | 1745 | 1892 | 1906 | 1750 | 1713 |
| Notched Izod Impact (KJ/m$^2$) | | | | | |
| Room Temp (≈23° C.) | 33 | 82 | 108 | 95 | 80 |
| 0° C. | 26* | 76 | 87 | 95 | 63 |
| −10° C. | 16* | 68 | 73 | 89 | 43 |
| −20° C. | | 20* | 21* | 77 | 18* |
| −30° C. | | 18* | 20* | 64 | 15* |
| −40° C. | | | | 19* | 14* |
| Notched Charpy Impact (KJ/m$^2$) | | | | | |
| Room Temp (≈23° C.) | 20* | 62 | 48 | 48 | 40 |
| 0° C. | 15* | 39 | 77 | 40 | 25 |
| −10° C. | 14* | 32 | 55 | 39 | 18* |
| −20° C. | | 21* | 26* | 29 | 15* |
| −30° C. | | 19* | | 16* | 12* |
| MFR @ 235° C. | 3.9 | 0.7 | 4.1 | 5.9 | 8.8 |
| MFR @ 275° C. | | | | | |

*Sample Broke

TABLE 2

| | Blend | | | |
|---|---|---|---|---|
| | 6 | 7 | 8 | 9 |
| Zytel 101 | 80 wt % | 80 wt % | 80 wt % | 80 wt % |
| REXT 670 | | 7 wt % | | |
| REXT 669 | 20 wt % | | | |
| REXT 750 | | | 3 wt % | |
| REXT 751 | | | | 20 wt % |
| Vistalon 606 | | 13 wt % | 17 wt % | |
| Flex. Mod. (MPa) | 1597 | 1539 | 1465 | 1670 |
| Stress at Max. Load (MPa) | 53 | 49 | 44 | 48 |
| Elongation at Break (%) | 78 | 86 | 48 | 49 |
| E-Modulus (MPa) | 1847 | 1757 | 1720 | 1840 |
| Notched Izod Impact (KJ/m$^2$) | | | | |
| 23° C. | | 79 | 110 | 92 | 90 |
| 0° C. | | 29* | 94 | 89 | 90 |
| −10° C. | | 22* | 83 | 83 | 72 |
| −20° C. | | | 33 | 55 | 27* |
| −30° C. | | | | 25* | 19* |
| Notched Charpy Impact (KJ/m$^2$) | | | | |
| 23° C. | | 42 | 53 | 43 | 44 |
| 0° C. | | 26 | 49 | 36 | 30 |
| −10° C. | | 22* | 44 | 33 | 18* |
| −20° C. | | | 25* | 21* | 13* |
| −30° C. | | | | | |
| MFR @ 235° C. | | | | | |
| MFR @ 275° C. | | 9.3 | 13.4 | 7.1 | 16.8 |

*Sample Broke

TABLE 3

| | Blow Molding | |
|---|---|---|
| | Blend | |
| | 10 | 11 |
| Ultramid B3 | 80 | 80 |
| REXT 767 | 20 | |
| REXT 750 | | 3 |
| EP 1 | | 17 |
| Flex. Mod. (MPa) | 1350 | 1360 |
| Stress at Max. Load (MPa) | 43 | 43 |
| Elongation at Break (%) | 106 | 92 |
| E-Modulus (MPa) | 1691 | 1745 |
| Notched Izod Impact (KJ/m$^2$) | | |
| 23° C. | 101 | 102 |
| 0° C. | 102 | 95 |
| −10° C. | 104 | 90 |
| −20° C. | 89 | 84 |
| −30° C. | 34 | 51 |
| −40° C. | 20* | 18* |
| Notched Charpy Impact (KJ/m$^2$) | | |
| 23° C. | 61 | 46 |
| 0° C. | 51 | 45 |
| −10° C. | 50 | 42 |
| −20° C. | 32 | 32 |
| −30° C. | 18* | 17* |
| MFR @ 235° C. | 2.9 | 5.9 |

*Sample Broke

The examples reported in Table 1 illustrate the advantages of using the blends versus the straight maleic anhydride grafted ethylene copolymer in polyamide-6 blends. Compared to the two references, REXT 704 and REXT 751, the three blends, and more specifically blend 4, show improved izod and charpy impact from room to low temperatures. At −30° C., blend 4 is still ductile, while REXT 751 is already brittle at −10° C. The examples in Table 2 also illustrate the better performance at lower temperatures of the blends, particularly blend 8, versus the grafted ethylene copolymers REXT 669 and REXT 751. Finally blend 11 described in Table 3 can be used as a substitute for REXT 767 which is a high molecular weight grafted EPDM suitable for blow molding applications. Although, EP1 is a very high molecular weight polymer, it has no processability debits as the presence of branching impart shear thinning.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A rubber toughened composition comprising a mixture of:
   a) 5 to 50 weight percent of a composition comprising a mixture of:
      (i) 10 to 70 weight percent of a copolymer of ethylene and a $C_3$ to $C_{18}$ α-olefin, said copolymer having a composition distribution breadth index of 50% or more and a molecular weight distribution of 4 or less, said copolymer further characterized as having grafted thereto 0.1 to about 10 weight percent of unsaturated acid or anhydride; and
      (ii) 90 to 30 weight percent of an elastomeric copolymer selected from the group consisting of elastomeric copolymers of ethylene and a $C_3$ to $C_8$ α-olefin and elastomeric copolymers of ethylene, a $C_3$ to $C_8$ α-olefin a nd a non-conjugated diene; and (b) 95 to 50 weight percent of a thermoplastic polymer selected from the group consisting of polyamides, polyesters, polyacetals and polycarbonates, said thermoplastic polymer containing a functional group capable of interacting with said unsaturated acid or anhydride.

2. The composition of claim 1 wherein the unsaturated acid or anhydride is maleic anhydryde or maleic acid.

3. The composition of claim 1 wherein the elastomeric copolymer is ethylene propylene rubber.

4. The composition of claim 1 wherein the thermoplastic polymer is a polyamide.

5. The composition of claim 1 wherein the elastomeric copolymer is an ethylene-higher α-olefin polymer composition comprising:

i) a first polymer fraction having a number average molecular weight of from 10,000 to 500,000, an ethylene content of from 30 to 60 weight %, and a diene content of from 1 to 12 weight %, based upon the weight of the polymer; and ii) a second polymer fraction having a number average molecular weight of from 100,000 to 10,000,000, an ethylene content of from 40 to 90 weight %, and a diene content of from 0 to 12 weight %, based upon the weight of the polymer; provided that:

a) the second fraction has a higher molecular weight than the first fraction, b) the second fraction has an equal or higher ethylene content than the first fraction, c) the weight ratio of diene in the first fraction to diene in the second fraction is at least 0.5 to 1, d) the Mw/Mn of each fraction is independently from 2 to 6.5, and e) the first fraction comprises 60 to 95 weight % of the total elastomeric polymer composition.

6. The composition of claim 1 wherein said copolymer component a (i) has a composition distribution breadth index of 70% or more and a molecular weight distribution of 3 or less.

7. The composition of claim 6 wherein said molecular weight distribution is from 1 to 2.

8. The composition of claim 1 wherein said thermoplastic polymer comprises a polyamide.

9. The composition of claim 1 wherein said elastomeric copolymer comprises ethylene/propylene rubber.

10. The composition of claim 1 wherein said elatomeric copolymer comprises ethylene/propylene/non-conjugated diene rubber.

11. The composition of claim 1 wherein said copolymer component a (i) comprises a copolymer of ethylene and a $C_3$ to $C_{12}$ α-olefin.

12. The composition of claim 1 wherein said copolymer component a(i) is prepared using a metallocene polymerization catalyst.

13. The composition of claim 1 wherein said elastomeric copolymer is grafted with 0.05 to 5 weight % of an unsaturated organic compound containing at least one carbonyl group.

14. The composition of claim 1 containing from 10 to 25 weight percent of said component (a) and 90 to 75 weight percent of said component (b).

15. The composition of claim 1 wherein said copolymer component a(i) comprises a copolymer of ethylene and butene.

* * * * *